United States Patent
Liu et al.

(10) Patent No.: US 11,608,130 B2
(45) Date of Patent: Mar. 21, 2023

(54) WHEEL-LEG MECHANISM AND WHEEL-LEGGED VEHICLE COMPRISING SAME

(71) Applicant: Beijing Institute of Technology, Beijing (CN)

(72) Inventors: Hui Liu, Beijing (CN); Xiaolei Ren, Beijing (CN); Ziyong Han, Beijing (CN); Zhiwei Liu, Beijing (CN); Quanfu Han, Beijing (CN); Yansong Gong, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/853,940

(22) Filed: Jun. 30, 2022

(65) Prior Publication Data

US 2023/0001994 A1  Jan. 5, 2023

(30) Foreign Application Priority Data

Jul. 1, 2021  (CN) .......................... 202110744550.4

(51) Int. Cl.
  *B62D 57/028*  (2006.01)
(52) U.S. Cl.
  CPC ................. *B62D 57/028* (2013.01)
(58) Field of Classification Search
  CPC .................................................. B62D 57/028
  See application file for complete search history.

(56) References Cited

FOREIGN PATENT DOCUMENTS

| CN | 105437950 A | | 6/2016 | |
|---|---|---|---|---|
| CN | 112623059 A | | 4/2021 | |
| CN | 112810720 A | * | 5/2021 | ........... B62D 57/028 |
| JP | 2009234534 A | * | 10/2009 | |

OTHER PUBLICATIONS

First Office Action Received in CN Application No. 202110744550 .4 dated Feb. 7, 2022, 12 Pages translation included.

* cited by examiner

*Primary Examiner* — Kevin Hurley
(74) *Attorney, Agent, or Firm* — David Postolski; Gearhart Law LLC (57) ABSTRACT

A wheel-leg mechanism is provided. The mechanism comprises a thigh, the upper end of the thigh is movably arranged in a mounting seat for a thigh motor, and is in transmission connection with a thigh motor, and the thigh motor is fixedly provided on one side of the mounting seat for a thigh motor; a shank motor is arranged at the side, away from the thigh motor, of the thigh, a suspension shock absorption system is connected to the shank motor, the shank motor is in transmission connection with a shank by a synchronous belt, the shank is movably connected to the tail end of the thigh, a wheel is movably mounted at the tail end of the shank, and the wheel is in transmission connection with a hub motor; and a braking system is provided on the wheel. A wheel-legged vehicle having the wheel-leg mechanism is further provided.

6 Claims, 7 Drawing Sheets

WHEEL-LEG MECHANISM AND WHEEL-LEGGED VEHICLE COMPRISING SAME

CROSS REFERENCE TO RELATED APPLICATION

This patent application claims the benefit and priority of Chinese Patent Application No. 202110744550.4 filed on Jul. 1, 2021, the disclosure of which is incorporated by reference herein in its entirety as part of the present application.

TECHNICAL FIELD

The present disclosure relates to the technical field of robots, and in particular relates to a wheel-leg mechanism and a wheel-legged vehicle comprising the wheel-leg mechanism.

BACKGROUND ART

With the development of science and technology as well as society, robots have been more widely used in occasions for replacing human beings, such as military investigation, emergency rescue, and detection of dangerous places. The complex, unknown, and variable unstructured environment proposes high requirements on the obstacle crossing ability of robots, while the urgency of the task requires that the robot should have the ability to move quickly.

At present, common robot mobile mechanisms are divided into a wheel type, a leg type, a composite type and the like. The wheel type robot mobile mechanism has fast speed, but poor terrain adaptability, while the leg type robot mobile mechanism has good maneuverability, but slower speed. As a combination of the leg type robot and a wheel type platform, the wheel-leg type vehicle has both the speedability of the wheel type and the high maneuverability of the leg type, and is a novel composite platform having an extensive application prospect and a research value.

An existing robot with the wheel-legged vehicle structure is usually slow in speed, the characteristic of high maneuverability of the wheel type robot is not fully reflected, resulting in that the robot in a high-speed state, when facing the impact of bumpy road, is hard to keep stable and prone to rolling over and overturning.

SUMMARY

An objective of the present disclosure is to provide a wheel-leg mechanism and a wheel-legged vehicle comprising the wheel-leg mechanism to solve the problems in the prior art. When facing impact of bumpy road, the wheel-legged vehicle provided by the present disclosure in a high-speed state can be kept stable and is free of rollover or overturn; and the braking performance of the vehicle can be effectively improved by adopting composite braking of electric braking and mechanical braking.

To achieve the objective, the present disclosure provides the technical solutions:

A wheel-leg mechanism provided by the present disclosure comprises a thigh, wherein an upper end of the thigh is movably arranged in a mounting seat for a thigh motor, the upper end of the thigh is in transmission connection with a thigh motor, and the thigh motor is fixedly provided on one side of the mounting seat for a thigh motor; a shank motor is provided on a. side, away from the thigh motor, of the thigh, a suspension shock absorption system is connected to the shank motor, the shank motor is in transmission connection with a shank by a synchronous belt, the shank is movably connected to a tail end of the thigh, a wheel is movably mounted at the tail end of the shank, and the wheel is in transmission connection with a hub motor; and a braking system is provided on the wheel. The braking system comprises a mechanical braking mechanism and an electric braking mechanism. The mechanical braking mechanism comprises a brake disc which synchronously rotates with the wheel, a brake caliper is arranged at the outside of the brake disc in a fit mode and connected with a controller through a brake cable, and the controller is arranged on the vehicle body and located at a position close to a connecting position of the vehicle body and the thigh; the controller is able to control the brake caliper to lock the brake disc through the brake cable. The controller comprises a stepping motor, the stepping motor is fixedly arranged on the vehicle body through a motor seat, a rocker arm is radially connected to an output shaft of the stepping motor, and the rocker arm is connected to the brake caliper through the brake cable. As the brake disc and the wheel are in synchronous rotation, the purpose of mechanically braking the wheel can be achieved through the cooperation of the brake caliper and the brake disc and by limiting the rotation of the brake disc. Through the cooperation of the mechanical braking and the electric braking of the hub motor, the double-braking effect of mechanical braking and motor braking is achieved, and the wheel braking capacity is greatly improved. Moreover, the reverse rotation energy of the electric braking can be recovered to greatly improve the vehicle efficiency.

Preferably, the wheel-leg mechanism comprises the mounting seat for a thigh motor fixedly connected to the vehicle body, the thigh motor is fixedly mounted at one side of the mounting seat for a thigh motor, the thigh motor is movably mounted at one side of the vehicle body and is in transmission connection with the thigh motor; the thigh motor is in transmission connection with the upper end part of the thigh movably arranged in the mounting seat for a thigh motor, the suspension shock absorption system is arranged in the upper end of the thigh, the shank motor is arranged at the outside of the thigh, the shank motor is in transmission connection with the shank by the synchronous belt, the shank is movably connected to the tail end of the thigh, the wheel is movably mounted at the tail end of the shank, and the wheel is in transmission connection with the hub motor; the braking system is provided at the wheel; the mounting seat for a thigh motor and the upper end part of the thigh are both provided with a plurality of first oblong holes provided in an axial direction; a telescopic part is arranged at the lower part of an electromagnetic pin, and a tail end of the telescopic part is able to sequentially penetrate through the first oblong holes at the mounting seat for a thigh motor and the upper end part of the thigh and then abuts against a torsional spring supporting seat of the suspension shock absorption system. Therefore, a transmission relation between the thigh and the outside of the suspension shock absorption system and the vehicle body can be controlled through stretching and retracting of the telescopic part of the electromagnetic pin. When the telescopic part of the electromagnetic pin moves downwards, the thigh, the outside of the suspension shock absorption system and the vehicle body are in fixed connection, at the moment, the vehicle is in the wheel type motion; the suspension shock absorption system can play a role to achieve shock absorption of the vehicle body. When the telescopic part of the electromagnetic pin moves upwards, the vehicle body, the thigh and the suspension shock absorption system are in free motion relation, at the moment, the vehicle is in leg type motion, and the suspension shock absorption system is driven by the shank motor, and thus the suspension shock absorption system does not work and does not interfere with the leg type motion process.

The electromagnetic pin is fixedly arranged on the vehicle body and is in signal connection with a control system of the vehicle body. The telescopic part of the electromagnetic pin comprises a push rod arranged at the bottom of the electromagnetic pin, a connecting block is mounted at a tail end of the push rod, the connecting block is able to sequentially penetrate through the first oblong holes on the mounting seat for a thigh motor and the upper end part of the thigh and abuts against the torsional spring supporting seat of the suspension shock absorption system. An elastic member is arranged between the end, close to the connecting block, of the push rod and the electromagnetic pin. Therefore, after receiving the different signals from the control system, the electromagnetic pin can quickly make response to control the telescopic part to move downwards or upwards.

Preferably, a U-shaped mounting groove is provided on the tail end of the thigh, a connecting shaft movably penetrates through two side walls of the U-shaped mounting groove, the connecting shaft is sleeved with a transition sleeve, and the transition sleeve is located in the U-shaped mounting groove; one end of the shank is provided with a pulley groove, a driven synchronous pulley is mounted in the pulley groove by a fixed pin, and a side wall of the pulley groove and the driven synchronous pulley both penetrate through the transition sleeve; and the driven synchronous pulley is in transmission connection with a driving synchronous pulley at the shank motor by the synchronous belt. By means of the structure of the U-shaped mounting groove structure, the end part of the shank motor and the driven synchronous pulley are able to rotate in a space of the groove. When the vehicle body is in leg type motion, the thigh and the shank operate stably without interference. As the structure of the thigh and the shank is similar to a skeleton connecting structure of the human leg, the thigh is not limited to apply the U-shaped mounting groove, other structures similar to semi-circular grooves, square grooves and the like can also be applied, as long as the connection of the thigh and the shank can be achieved and the normal operation of the thigh and the shank cannot be hindered. The specific structure at the tail end of the thigh is not limited.

The shank motor drives the driving synchronous pulley to rotate, the driving synchronous pulley drives the driven synchronous pulley to rotate by means of the synchronous belt, and then the driven synchronous pulley mounted at the upper end portion of the shank through the fixed pin is able to drive the shank to rotate around the tail end of the thigh, thus achieving the leg type motion of the vehicle body.

Preferably, the connecting shaft is sleeved with a spacer ring, and the spacer ring is located between the transition sleeve and the inner wall of the U-shaped mounting groove. By means of a structure of the spacer ring, the transition sleeve can be positioned on the connecting shaft to prevent the transition sleeve from sliding around to collide with the inner wall of the U-shaped mounting groove, thus avoiding the interference among the driven synchronous pulley on the transition sleeve, the side wall of pulley groove at the upper end of the shank and the U-shaped mounting groove at the lower end of the thigh. Therefore, the thigh and the shank can operate more flexibly during leg type motion.

Preferably, the fixed end of the hub motor is mounted on an inner side of the shank by a bolt; a rotating part of the hub motor is connected to a hub motor connecting flange by a bolt, and a wheel connecting shaft is fixedly connected to the hub motor connecting flange. A connecting flange is fixedly connected to the outside of the shank; two wheel support bearings are mounted at the outside of the connecting flange, a shaft sleeve is provided between the two wheel support bearings, and the axial ends of the two wheel support bearings are locked by locking nuts, and the locking nuts are padded with check washers. A bearing seat is mounted at an outer ring of each of the support bearings; one side, close to the shank, of the bearing seat is sleeved with a brake disc, and the brake disc is axially fixed to the bearing seat by a bearing cap. A brake caliper is mounted on the shank, and the brake caliper is able to clamp and fix the brake disc. The wheel is fixedly mounted at one side, away from the shank, of the bearing seat by a wheel transition disc; and one end, away from the hub motor connecting flange, of the wheel connecting shaft movably penetrates through the connecting flange and then is fixedly connected to the wheel transition disc. A rectangular groove is formed on the wheel transition disc, a rectangular hole is formed on the connecting flange of the hub motor, the wheel connecting shaft is a square shaft, and both ends of the wheel connecting shaft are fixedly connected to the rectangular groove and the rectangular hole respectively.

A wheel-legged vehicle is further provided by the present disclosure. The wheel-legged vehicle comprises a vehicle body, four wheel-leg mechanisms as above are symmetrically arranged at both sides of the vehicle body. The suspension shock absorption system is provided at a connecting position of the vehicle body and each of the wheel-leg mechanisms. A control system, a sensing and decision-making system, an electric system and an Ad-Hoc network cluster control system are mounted on the vehicle body. The control system is electrically connected to the wheel-leg mechanisms and the braking system respectively, and the braking system comprises a mechanical braking mechanism and an electric braking mechanism.

Preferably, the electric system further comprises a power battery. The power battery is electrically connected to the thigh motor, the shank motor and the hub motor respectively. The control system comprises an on-board controller. The sensing and decision-making system comprises a laser radar and a binocular camera and is in signal connection with the control system.

Compared with the prior art, the present disclosure has the following technical effects:

When facing the impact of the bumpy road, the vehicle body in a high-speed state can be kept stable and is free of rollover or overturn. By applying hybrid braking of electric braking and mechanical braking, the braking performance of the vehicle can be effectively improved. The available space of the leg part between the thigh and the shank is large to meet the high obstacle crossing ability requirement under a complex terrain. The whole wheel-legged vehicle applies a modular design, and the complexity of a mechanical system is reduced by means of the modular design; and the flexible arrangement of a vehicle body chassis improves the durability, agility and reliability essentially, and cost for deployment and maintenance is reduced. By means of the modular design, the control system is simple in system structure, and the energy transfer efficiency is improved. The vehicle body is provided with a plurality of functional systems such as a control system, vision, positioning, navigation, communication and modular load, the weight is reduced as much as possible on the premise of ensuring design stiffness and strength. The suspension shock absorption system is integrated inside thigh and used for wheel mode shock absorption to ensure high maneuverability of the platform, and the braking system is used for mechanical braking in a wheel mode and cooperates with motor braking to ensure that wheel does not slide in the leg mode.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

In the drawings: 100—wheel-legged vehicle, 1—vehicle body; 2—wheel-leg mechanism, 201—thigh, 202—shank, 203—connecting shaft, 204—transition sleeve, 205—driven synchronous pulley, 206—spacer ring, 207—U-shaped mounting groove, 208—pulley groove, 209—fixed pin, 3—suspension shock absorption system, 4—braking system, 5—laser radar, 6—wheel, 7—hub motor, 8—thigh motor, 801—mounting seat, 9—electromagnetic pin, 10—synchronous belt, 11—disc spring, 12—torsional spring, 13—shank motor, 14—binocular camera, 15—combined navigation, 16—hub motor connecting flange, 17—wheel connecting shaft, 16—connecting flange, 19—wheel support bearing, 20—shaft sleeve, 21—locking nut, 22—bearing seat, 23—brake disc, 24—brake caliper, 25—wheel transition disc, 26—driving synchronous pulley, 27—first shock absorption part, 28—second shock absorption part, 29—connecting sleeve, 30—outside mounting sleeve, 31—torsional spring support seat, 32—disc spring seat, 33—ball, 34—ball bearing, 35—internal teeth friction plate, 36—external teeth friction plate, 37—baffle, 38—telescopic part of the electromagnetic pin, 39—push rod, 40—connecting block, 41—elastic member, 42—sensing and decision-making system, 43—Ad-Hoc network cluster control system, 44—on board controller, 45—, 46—bolt, 47—check spacer, 48—bearing cap.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a wheel-leg mechanism and a wheel-legged vehicle comprising the wheel-leg mechanism to solve the problems in the prior art. When facing impact of bumpy road, the wheel-legged vehicle provided by the present disclosure in a high-speed state can be kept stable and is free of rollover or overturn; and the braking performance of the vehicle can be effectively improved by adopting composite braking of electric braking and mechanical braking.

To make the objective, features and advantages of the present disclosure more clearly understandable, the following further describes the present disclosure in detail with reference to the accompanying drawings and the specific embodiments.

Figure 3:
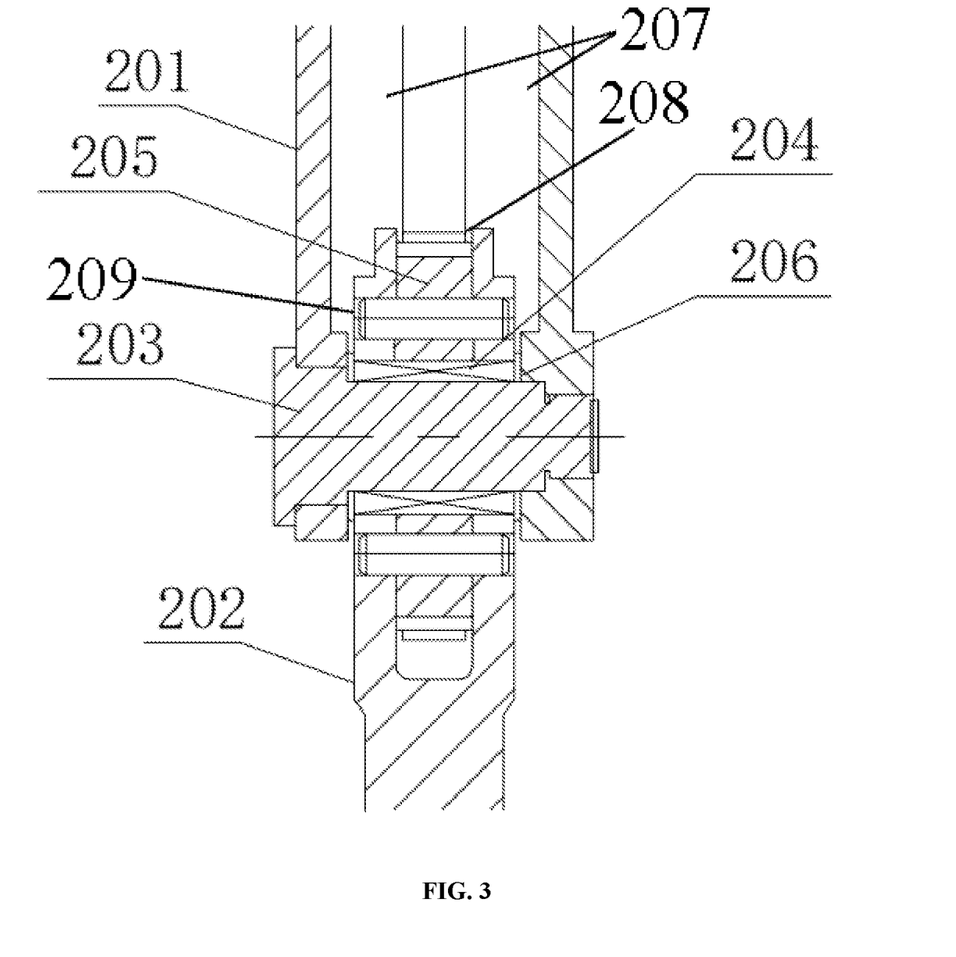
FIG. 3 is a sectional diagram of a connecting part of a thigh and a shank of the present disclosure.
Figure 4:
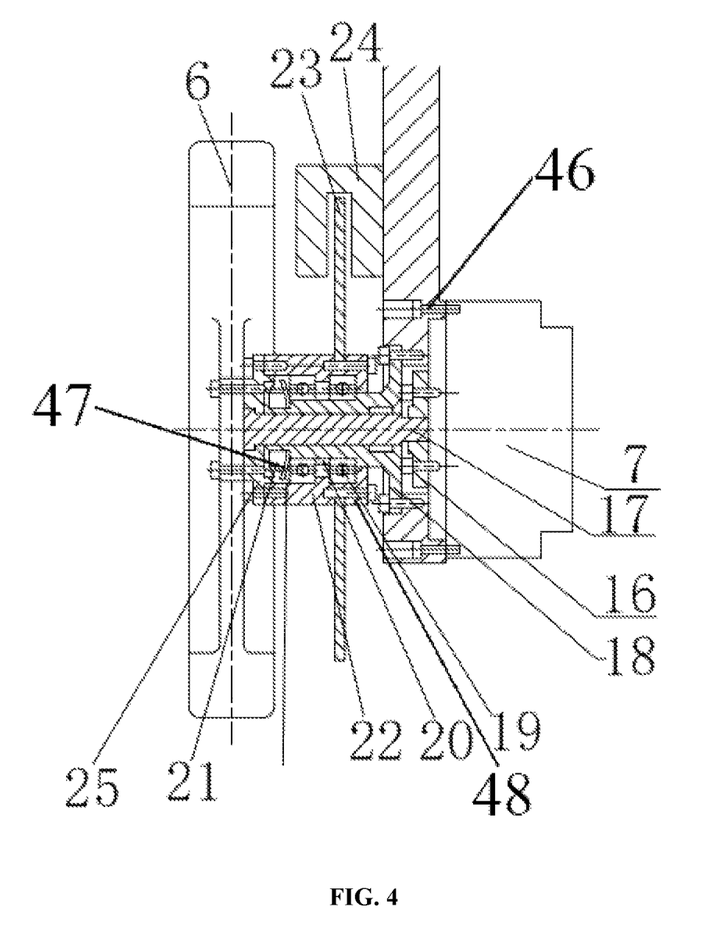
FIG. 4 is a schematic diagram of a structure at a position of a shank and a wheel of the present disclosure.
Figure 5:
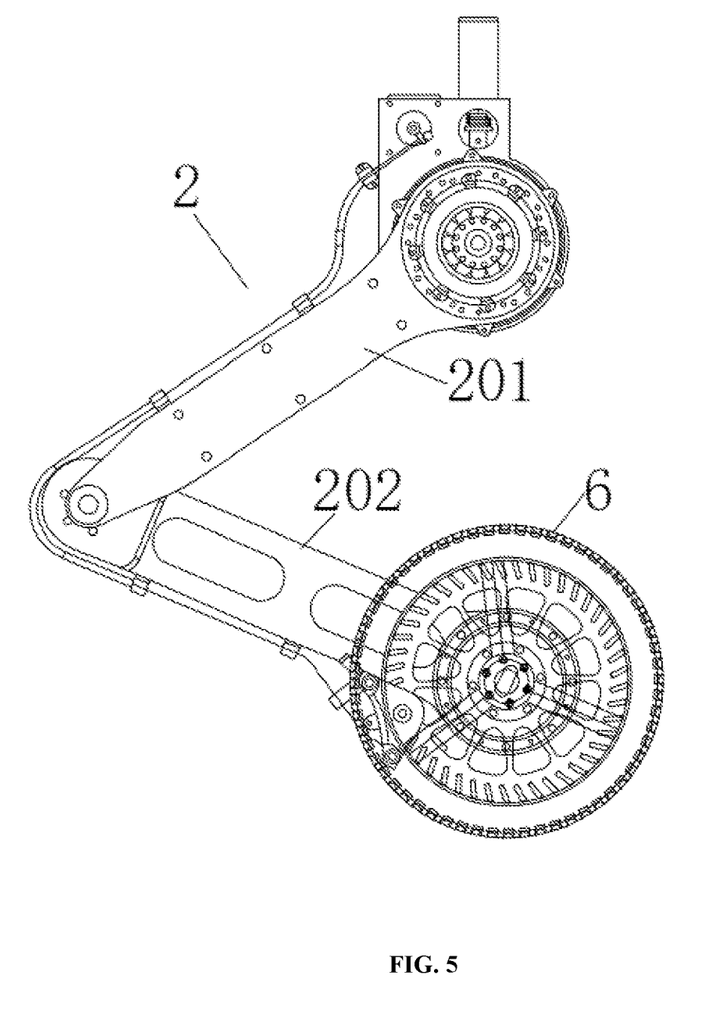
FIG. 5 is a schematic diagram of a structure of a wheel-leg mechanism of the present disclosure.

Refer to FIG. 3, FIG. 4 and FIG. 5, a wheel-leg mechanism 2 is provided. The wheel-leg mechanism comprises a thigh 201, the upper end of the thigh 201 is movably arranged in a mounting seat 801 for a thigh motor, the upper end of the thigh 201 is in transmission connection with a thigh motor 8, and the thigh motor 8 is fixedly arranged at one side of the mounting seat for a thigh motor. A shank motor 13 is arranged at one side, away from the thigh motor 8, of the thigh 201, a suspension shock absorption system is connected to the shank motor 13, the shank motor 13 is in transmission connection with a shank 202 by a synchronous belt 10, the shank 202 is movably connected to the tail end of the thigh 201, and a wheel 6 is movably mounted at the tail end of the shank 202 and is in transmission connection with a hub motor 7. A braking system is arranged at the wheel 6.

As shown in FIG. 3, a U-shaped mounting groove 207 is arranged at the tail end of the thigh 201, a connecting shaft 203 movably penetrates through two side walls of the U-shaped mounting groove and is sleeved with a transition sleeve 204, and the transition sleeve 204 is located in the U-shaped mounting groove. One end of the shank 202 is provided with a pulley groove 208 which is not specifically limited in structure. A driven synchronous pulley 205 is installed in the pulley groove by a fixed pin 209, and a side wall of the pulley groove and the driven synchronous pulley 205 both penetrate through the transition sleeve 204. The driven synchronous pulley 205 is in transmission connection with a driving synchronous pulley 26 at the shank motor 13 by a synchronous belt 10. By means of the structure of the U-shaped mounting groove structure, the end part of the shank motor and the driven synchronous pulley 205 are able to rotate in a space of the groove, such that the thigh 201 and the shank 202 operate stably without interference when the vehicle body 1 is in the leg type motion. As the structure of the thigh and the shank is similar to a skeleton connecting structure of the human leg, the thigh is not limited to apply the U-shaped mounting groove, other structures similar to semi-circular grooves, square grooves and the like can also be applied, as long as the connection of the thigh and the shank can be achieved and the normal operation of the thigh 201 and the shank 202 cannot be hindered. The specific structure at the tail end of the thigh 201 is not limited.

The fixed end of the hub motor 7 is mounted at the inner side of the shank 202 by a bolt 46, a rotating part of the hub motor 7 is connected to a hub motor connecting flange 16 by a bolt, and a wheel connecting shaft 17 is fixedly connected to the hub motor connecting flange 16. A connecting flange 18 is fixedly connected to the outside of the shank 202, two wheel support bearings 19 are mounted at the outside of the connecting flange 18, a shaft sleeve 20 is arranged between the two wheel support bearings 19, the axial ends of the two wheel support bearings 19 are locked by locking nuts to prevent the bearings from sliding, and the locking nuts 21 are padded with check spacers 47. A bearing seat 22 is mounted at an outer circle of each support bearing 19, one side, close to the shank 202, of the bearing seat 22 is sleeved with a brake disc 23, and the brake disc 23 is axially fixed to the bearing seat 22 by using a bearing cap 48. A brake caliper 24 is mounted on the shank 202, and the brake caliper 24 is able to clamp and fix the brake disc 23, thus achieving the purpose of mechanically braking the wheel. The wheel 6 is fixedly mounted to one side, away from the shank 202, of the bearing seat 22 by means of a wheel transition disc 25; one end, away from the hub motor connecting flange 16, of the wheel connecting shaft 17 movably penetrates through the connecting flange 18 and then is fixedly connected to the wheel transition disc 25, and the connecting flange 18 does not interfere with the normal rotation of the wheel connecting shaft 17. A rectangular groove is machined on the wheel transition disc 25, a rectangular hole is further machined on the hub motor connecting flange 16, the wheel connecting shaft 17 is a square shaft, both ends of which are fixedly connected to the rectangular groove and the rectangular hole respectively.

Figure 1:
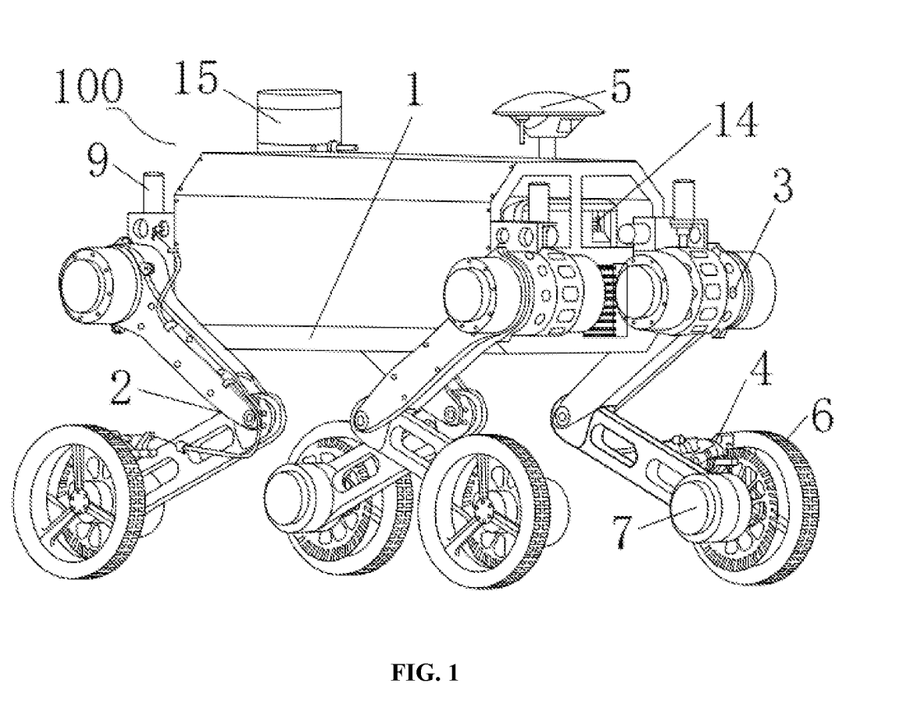
FIG. 1 is a schematic diagram of a structure of a wheel-legged vehicle of the present disclosure.
Figure 2:
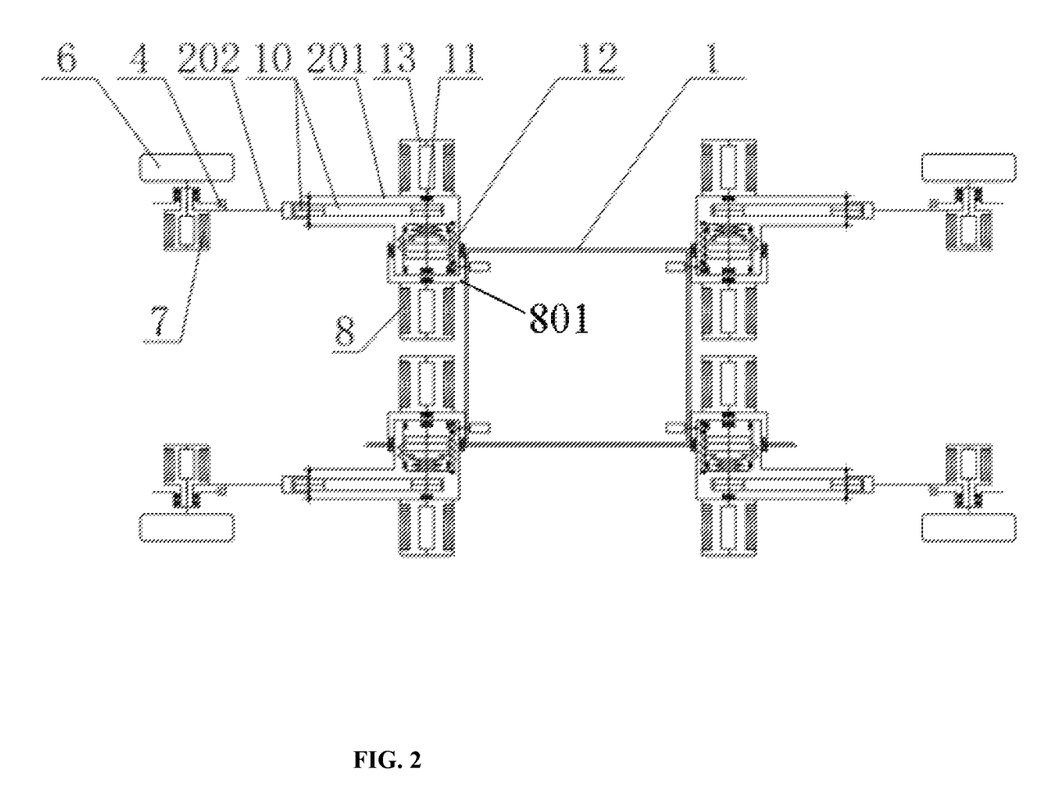
FIG. 2 is a schematic diagram illustrating a top-view state of a wheel-legged vehicle and arrangement of wheel-leg mechanisms of the present disclosure.

Refer to FIG. 1 to FIG. 3, a wheel-legged vehicle 100 is further provided. The wheel-legged vehicle 100 comprises a vehicle body 1, four wheel-leg mechanisms 2 are symmetrically arranged at both sides of the vehicle body 1, a suspension shock absorption system 3 is arranged at a connecting position of each of the wheel-leg mechanisms 2 and the vehicle body 1, and a braking system 4 is mounted on each of the wheel-leg mechanisms 2. A control system, a sensing and decision-making system 42, a power battery 45 and an Ad-Hoc network cluster control system 43 are mounted on the vehicle body 1. The control system comprises an on board controller 44 which is electrically connected to the wheel-leg mechanisms 2 and the braking systems 4 respectively. Preferably, the wheel-leg mechanism 2 comprises a mounting seat for a thigh motor fixedly connected to the vehicle body 1, a thigh motor 8 is fixedly mounted to one side of the mounting seat for a thigh motor, and a thigh 201 is movably connected to one side of the vehicle body 1 and is in transmission connection with the thigh motor 8. The thigh motor 8 is in transmission connection with the upper end part of the thigh movably arranged in the mounting seat for a thigh motor, a suspension shock absorption system 3 is arranged in the upper end part of the thigh, a shank motor 13 is arranged at the outside of the thigh 201 and is in transmission connection with a shank 202 by means of a synchronous belt 10, the shank 202 is movably connected to the tail end of the thigh 201, a wheel 6 is movably mounted at the tail end of the shank 202 and is in transmission connection with the hub motor 7. The braking system is arranged at the wheel 6. The braking system 4 comprises a mechanical braking mechanism consisting of brake caliper 24 and the brake disc 23 and an electric braking mechanism consisting of hub motor 7. The mechanical braking system comprises a brake disc 23 which synchronously rotates with the wheel 6, a brake caliper 24 is arranged at the outside of the brake disc 23 in a fitting mode, a controller is connected to the brake caliper through a brake cable, and the controller is arranged on the vehicle body and is located close to a connecting position of the vehicle body 1 and the thigh. The controller is able to control the brake caliper 24 to lock the brake disc 23 via the brake cable. The controller comprises a stepping motor, the stepping motor is fixedly arranged on the vehicle body 1 by a motor base, a rocker arm is radially connected to an output shaft of the stepping motor, and the rocker arm is connected to the brake caliper 24 via the brake cable. As the brake disc 23 and the wheel 6 are in synchronous rotation, the purpose of mechanically braking the wheel 6 can be achieved through the cooperation of the brake caliper 24 and the brake disc 23 and by limiting the rotation of the brake disc 23. Through the cooperation of the mechanical wheel braking and the electric wheel braking of the hub motor 7, the double-braking effect of mechanical braking and motor braking is achieved, and the wheel braking capacity is greatly improved. Moreover, the reverse rotation energy of the electric braking can be recovered to greatly improve the vehicle efficiency.

Figure 6:
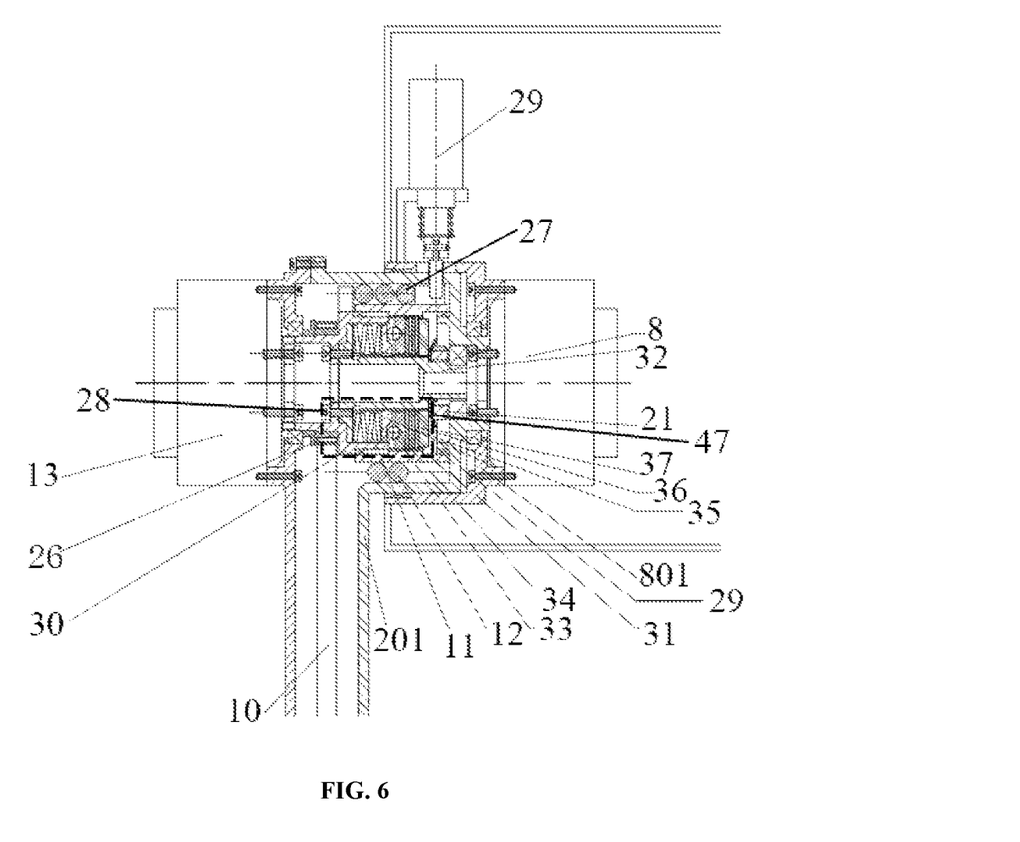
FIG. 6 is a schematic diagram of a cross-section of the structure of the wheel-leg mechanism of the present disclosure.

Specifically, the suspension shock absorption system 3 comprises a first shock absorption part 27, and a second shock absorption part capable of rotating relatively is arranged in the first shock absorption part. One end of the first shock absorption part is mounted on a connecting sleeve 29 by an outside mounting sleeve 30, and the other end of the first shock absorption part is used for being connected to a first thigh arm of the thigh 201. The end, away from the first shock absorption part, of the connecting sleeve is connected to a second thigh arm of the thigh by the support bearing, one end of the first thigh arm is connected to the mounting seat for a thigh motor by the support bearing of the first thigh arm, and the other end of the first thigh arm is connected to the mounting seat for a thigh motor by the outside mounting sleeve of the first thigh arm. One side, away from the thigh motor 8, of the first thigh arm is fixedly connected to the second thigh arm, the upper end of the first thigh arm is arranged in the thigh motor 8 mounting seat, the upper end of the second thigh arm is arranged outside the mounting seat for a thigh motor, and the thigh motor 8 is in transmission connection with the upper end of the first thigh arm. One end of the second shock absorption part is fixedly connected to the connecting sleeve, and the other end of the second shock absorption part is mounted on the first thigh arm by a bearing. The first shock absorption part comprises a torsional spring support seat 31 which is sleeved with a torsional spring, one end of the torsional spring is fixedly connected to the connecting sleeve, and the other end of the torsional spring is fixedly connected to the torsional spring support seat. One end of the torsional spring support seat is mounted at outside of one end of the connecting sleeve by the outside mounting sleeve, and the other end of the torsional support seat is mounted on the first thigh arm by an inner mounting sleeve. The second shock absorption part 28 comprises a disc spring seat 32. The disc spring seat penetrates through the torsional spring support seat, one end of the disc spring seat is fixedly connected to the inner side of one end of the connecting sleeve by a bolt, and the other end of the disc spring seat can be mounted on the first thigh arm by an inside support bearing of the disc spring seat, wherein the bearing is an inside mounting bearing of the disc spring seat. A disc spring 11, a disc spring pressing plate, a ball 33, a ball bearing 34, an internal teeth friction plate 35, an external teeth friction plate 36 and a baffle 37 are sequentially and axially mounted on the disc spring seat from the end close to the connecting sleeve to the end away from the connecting sleeve. The outside of the baffle is provided with a locking nut, and a check spacer is provided between the locking nut and the baffle. The internal teeth friction plate is connected to the disc spring seat by means of curved teeth, and the outer tooth friction plate is connected to an inner wall of the torsional spring support seat by means of curved teeth.

Figure 7:
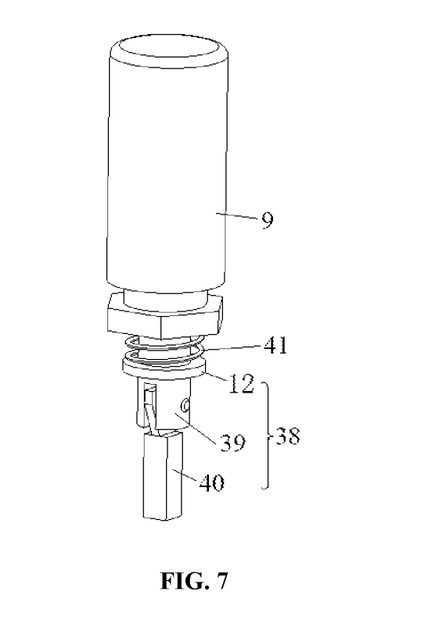
FIG. 7 is a schematic diagram of a structure of the electromagnetic pin of the present disclosure.

When the wheel-legged vehicle moves employs wheel type motion or wheel-leg type motion, and swing arms of the thigh 201 and the shank 202 are controlled by respective motors to be rotated to a fixed angle, the electromagnetic pin 9 is powered off, the push rod drives the pin and the connecting block to move downward, the spring elongates under the action of the own elasticity, and then drives the connecting block to insert into the oblong holes on the mounting seat for a thigh motor and at the upper end of the thigh to abut against the torsional spring seat; and the thigh motor 8 mounting seat is fixed onto the vehicle body to achieve circumferential fixation of the mounting seat for a thigh motor, the thigh 201 and the torsional spring support seat; under the circumferential fixation, the thigh motor 8 is mechanically locked, the torsional spring support seat is fixed, and the shock absorption mechanism connected to the suspension shock absorption system can play a role. When the vehicle passes through the obstacle on the road, the shank 202 is hit by the obstacle on the rod, and then the shank 202 is reversely connected through the pin, the driven synchronous pulley, the synchronous belt 10, the driving synchronous pulley to the connecting sleeve and the disc spring seat, thus achieving simultaneous rotation of the disc spring seat and the connecting sleeve. The torsional spring is fixedly connected to the outer cylindrical surface of a positioning part of the connecting sleeve; the other end of the torsional spring 12 is fixedly connected to the torsional spring support seat, thus playing a role in initially buffering. The disc spring, the disc spring pressing plate, the ball, the ball bearing, the internal teeth friction plate, the external teeth friction plate, the baffle and other parts are mounted on the disc spring seat. During the rotation of the disc spring seat, the axial compressing between the external teeth friction plate and the internal teeth friction plate can be achieved by means of a circumferential movement of a ball in a spherical spiral groove in the ball bearing, thus achieving shock absorption and buffering effect of the vehicle. The impact on the ground is buffered, the shock absorption is achieved, and the vehicle body is prevented from shaking or overturning. When the vehicle body employs the leg type motion and the electromagnetic pin 9 is powered on, under the action of the electromagnetic force, the pin moves upwards, the spring is compressed, the connecting block is retracted from the oblong holes, and the circumferential fixation of the mounting seat for a thigh motor, the thigh and the torsional support seat disappears, thus the swing arm of the thigh and the thigh motor 8 can rotate freely, the shock absorption mechanism rotates along with the shank motor, the shank motor 13 can drive the suspension mechanism to rotate accordingly during operation without interfering with the motion of the shank 202, thus preventing a condition that the control of the driving system on the leg joints is affected.

A fixed part of the hub motor 7 is mounted on the inner side of the shank 202 by the bolt; the rotating part of the hub motor 7 is connected to the hub motor connecting flange by a bolt, and the hub motor connecting flange is connected to the outside of the shank 202 by the bolt. Two wheel support bearings are mounted on the hub motor connecting flange and are separated from each other by a shaft sleeve; the axial end of each bearing is locked by the locking nut and padded with the check spacer to prevent loosening. The bearing seat is mounted on the outer ring of each support bearing. The brake disc is mounted at one side, close to the shank, of the bearing seat, and is axially fixed onto the bearing seat by the bearing cap. The brake caliper is mounted on the shank 202. The wheel 6 is mounted at one side of the bearing seat by a wheel transition disc. A rectangular groove is machined on the wheel transition disc, a rectangular hole is machined on the hub motor connecting flange, and the wheel transition disc and the hub motor connecting flange are connected by a shaft having two square ends.

The mounting seat for a thigh motor and the upper end part of the thigh are provided with a plurality of first oblong holes provided in an axial direction, a telescopic part is arranged at the lower part of the electromagnetic pin, and the tail end of the telescopic part can sequentially penetrate through the first oblong holes on the mounting seat for a thigh motor and at the upper end part of the thigh to abut against the torsional spring support seat of the suspension shock absorption system 3. Therefore, a transmission relation between the thigh 201 and the outside of the suspension shock absorption system 3 and the vehicle body 1 can be controlled through the stretching and retracting of the telescopic part of the electromagnetic pin. When the telescopic part of the electromagnetic pin moves downwards, the thigh 201, the outside of the suspension shock absorption system 3 and the vehicle body 1 are in fixed connection, at the moment, the vehicle body is in the wheel type motion; the suspension shock absorption system 3 can play a role to achieve shock absorption of the vehicle body 1. When the telescopic part of the electromagnetic pin 9 moves upwards, the vehicle body 1, the thigh 201 and the suspension shock absorption system 3 are in a free motion relation, at the moment, the vehicle is in a leg type motion, the suspension shock absorption system 3 is driven by the shank motor, and therefore, the suspension shock absorption system 3 does not operate and does not interfere with the leg type motion process.

Specifically, when the wheel-legged vehicle needs to be braked, the motor braking is conducted by the hub motor 7 according to braking torque requirement, when the motor braking is not enough to achieve the required braking torque, a control unit inputs a corresponding rotating angle to the stepping motor, the stepping motor drives the rocker arm to rotate, the rocker arm drives a lead block to tension the brake cable, the brake cable passes through a cable clamp and a cable pipe and then acts on the brake caliper 24, and the brake caliper 24 locks the brake disc 23 to make the rotating speed of the wheel 6 decrease, thus achieving the purpose of braking. When the wheel-legged vehicle needs to lock the wheel motor during foot motion, the stepping motor outputs the maximum angle, and the brake cable acts on the brake caliper 24 to output the maximum braking torque to the brake disc 23, thus locking the wheel motor.

The electromagnetic pin 9 is fixedly arranged on the vehicle body 1 and is in signal connection with the control system of the vehicle body 1, the telescopic part 38 of the electromagnetic pin 9 comprises the push rod 39 arranged at the bottom of the electromagnetic pin, the connecting block 40 is mounted at the tail end of the push rod and is able to sequentially penetrate through the first oblong holes on the mounting seat for a thigh motor and at the upper end part of the thigh to abut against the torsional spring support seat of the suspension shock absorption system. An elastic member 41 is arranged between the end, close to the connecting block, of the push rod and the electromagnetic pin. After receiving the different signals of the control system, the electromagnetic pin can quickly make response to control the telescopic part to move downwards or upwards.

In accordance with the present disclosure, the shank motor drives the driving synchronous pulley to rotate, the driving synchronous pulley drives the driven synchronous pulley to rotate by the synchronous belt, and then the driven synchronous pulley mounted at the upper end part of the shank by the fixed pin can drive the shank to rotate around the tail end of the thigh, thus achieving the leg type motion of the vehicle body. To make the fixation firmer, the connecting shaft 203 is sleeved with the spacer ring 206, and the spacer ring 206 is located between the transition sleeve 204 and the inner wall of the U-shaped mounting groove. By means of the structure of the spacer ring 206, the transition sleeve 204 is located on the connecting shaft 203 to prevent the transition sleeve 204 from sliding around and collide with the inner wall of the U-shaped mounting groove, thus avoiding the interference among the driven synchronous pulley on the transition sleeve 204 and the side wall of the pulley groove at the upper end of the shank and the U-shaped mounting groove at the lower end of the thigh. When the vehicle body is in the leg type motion, the thigh 201 and the shank 202 operate more flexibly.

Figure 8:
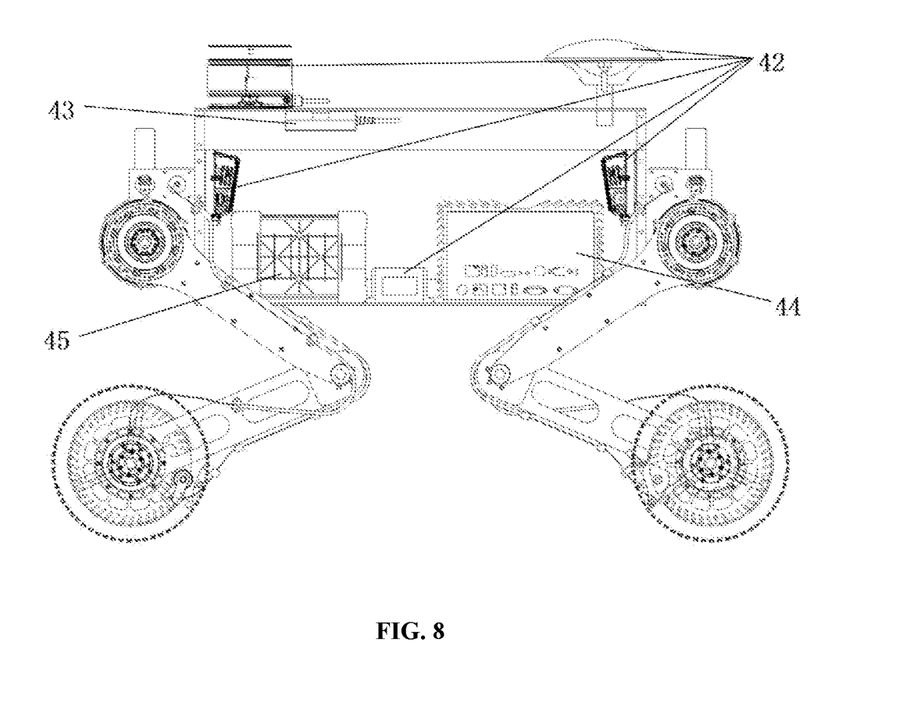
FIG. 8 is a schematic diagram of the handling system of a wheel-legged vehicle the present disclosure.

The electric system comprises a power battery 45. The power battery is electrically connected to the thigh motor, the shank motor and the hub motor respectively. The sensing and decision-making system comprises laser radar 5 and a binocular camera 14. The vehicle body 1 is further provided with a combined navigation 15, which is convenient for guiding a direction for the travel of the vehicle body 1, high in degree of automation and easy to control. The sensing and decision-making system is in signal connection with the control system, and the weight is reduced as much as possible under the premise of ensuring the design stiffness and strength.

In the description of the embodiments of the present disclosure, it needs to be noted that orientation or positional relationship indicated by the terms "center", "top", "bottom", "left", "right", "vertical", "horizontal", "inner", "outer" and the like is based on the orientation or positional relationship shown in the drawings only for convenience of description of the present disclosure and simplification of description rather than indicating or implying that the device or element referred to must have a particular orientation, be constructed and operate in a particular orientation, and thus are not to be construed as limiting the present disclosure. In addition, the terms "first" and "second" are used for the purpose of description rather than indicating or implying relative importance.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A wheel-leg mechanism, comprising:
   a thigh and an electromagnetic pin, wherein an upper end of the thigh is movably arranged in a mounting seat for a thigh motor, the upper end of the thigh is in transmission connection with the thigh motor, and the thigh motor is fixedly provided on one side of the mounting seat for a thigh motor;
   a shank motor is provided on a side, away from the thigh motor, of the thigh, a suspension shock absorption system is connected to the shank motor, the suspension shock absorption system comprises a first shock absorption part, and a second shock absorption part capable of rotating relatively is arranged in the first shock absorption part, one end of the first shock absorption part is mounted on a connecting sleeve by an outside mounting sleeve;
   the first shock absorption part comprises a torsional spring support seat which is sleeved with a torsional spring, the second shock absorption part comprises a disc spring seat, the disc spring seat penetrates through the torsional spring support seat;
   a disc spring, a disc spring pressing plate, a ball, a ball bearing, an internal teeth friction plate, an external teeth friction plate and a baffle are sequentially and axially mounted on the disc spring seat from the end close to the connecting sleeve to the end away from the connecting sleeve;
   the shank motor is in transmission connection with a shank by a synchronous belt, the shank is movably connected to a tail end of the thigh, a wheel is movably mounted at a tail end of the shank, and the wheel is in transmission connection with a hub motor;
   a braking system is provided on the wheel;
   a U-shaped mounting groove is provided at the tail end of the thigh, a connecting shaft movably penetrates through two side walls of the U-shaped mounting groove, and the connecting shaft is sleeved with a transition sleeve, and the transition sleeve is located in the U-shaped mounting groove; one end of the shank is provided with a pulley groove, a driven synchronous pulley is mounted in the pulley groove by a fixed pin, a side wall of the pulley groove and the driven synchronous pulley both penetrate through the transition sleeve; and the driven synchronous pulley is in transmission connection with a driving synchronous pulley at the shank motor by a synchronous belt;
   the connecting shaft is sleeved with a spacer ring, and the spacer ring is located between the transition sleeve and an inner wall of the U-shaped mounting groove;
   the electromagnetic pin is fixedly arranged on a vehicle body and is in signal connection with a control system of the vehicle body, a telescopic part of the electromagnetic pin comprises a push rod arranged at the bottom of the electromagnetic pin, a connecting block is mounted at a tail end of the push rod, the connecting block is able to sequentially penetrate through first oblong holes on the mounting seat for a thigh motor and the upper end part of the thigh and abuts against the torsional spring supporting seat of the suspension shock absorption system, an elastic member is arranged between the end, close to the connecting block, of the push rod and the electromagnetic pin;
   when the telescopic part of the electromagnetic pin moves downwards, the thigh, the outside of the suspension shock absorption system and the vehicle body are in fixed connection, at the moment, the vehicle body is in a wheel-motion; the suspension shock absorption system can play a role to achieve shock absorption of the vehicle body, when the telescopic part of the electromagnetic pin moves upwards, the vehicle body, the thigh and the suspension shock absorption system are in a free motion relation, at the moment, the vehicle is in a leg-motion.

2. The wheel-leg mechanism according to claim 1, wherein a fixed end of the hub motor is mounted on an inner side the shank by a bolt; a rotating part of the hub motor is connected to a hub motor connecting flange by a bolt, and a wheel connecting shaft is fixedly connected to the hub motor connecting flange; a connecting flange is fixedly connected to an outside of the shank; two wheel support bearings are mounted at an outside of the connecting flange, a shaft sleeve is provided between the two wheel support bearings, and axial ends of the two wheel support bearings are locked by locking nuts, and the locking nuts are padded with check washers; a bearing seat is mounted at an outer ring of each support bearing, a side, close to the shank, of each bearing seat is sleeved with a brake disc, and the brake disc is axially fixed to the bearing seat by a bearing cap; a brake caliper is mounted on the shank, and the brake caliper is able to clamp and fix the brake disc; the wheel is fixedly mounted at one side, away from the shank, of the bearing seat by a wheel transition disc; one end, away from the hub motor connecting flange, of the wheel connecting shaft movably penetrates through the connecting flange and then is fixedly connected to the wheel transition disc.

3. A wheel-legged vehicle, comprising the vehicle body, wherein four wheel-leg mechanisms according to claim 1 are symmetrically arranged at both sides of the vehicle body; the suspension shock absorption system is arranged at a connecting position of the vehicle body and each of the wheel-leg mechanisms; a control system, a sensing and decision-making system, a power battery, and an Ad-Hoc network cluster control system are mounted on the vehicle body; the control system is electrically connected to the wheel-leg mechanism and a braking system respectively; and the braking system comprises a mechanical braking mechanism consisting of a brake caliper and a brake disc and an electric braking mechanism consisting of a hub motor.

4. The wheel-legged vehicle according to claim 3, wherein the power battery is electrically connected to the thigh motor, the shank motor and the hub motor respectively; the control system comprises an on-board controller; the sensing and decision-making system comprises a laser radar and a binocular camera, and the sensing and decision-making system is in signal connection with the control system.

5. A wheel-legged vehicle, comprising a vehicle body, wherein four wheel-leg mechanisms according to claim 2 are symmetrically arranged at both sides of the vehicle body; the suspension shock absorption system is arranged at a connecting position of the vehicle body and each of the wheel-leg mechanisms; a control system, a sensing and decision-making system, a power battery, and an Ad-Hoc network cluster control system are mounted on the vehicle body; the control system is electrically connected to the wheel-leg mechanism and a braking system respectively; and the braking system comprises a mechanical braking mechanism consisting of a brake caliper and a brake disc and an electric braking mechanism consisting of a hub motor.

6. The wheel-legged vehicle according to claim 5, wherein the power battery is electrically connected to a thigh motor, a shank motor and a hub motor respectively; the control system comprises an on-board controller; the sensing and decision-making system comprises a laser radar and a binocular camera, and the sensing and decision-making system is in signal connection with the control system.

* * * * *